United States Patent
Harris et al.

(10) Patent No.: US 12,393,573 B1
(45) Date of Patent: Aug. 19, 2025

(54) FILTERING MATERIALS BASED ON USER INTENT CAPTURE USING LARGE LANGUAGE MODELS

(71) Applicant: AUTODESK, INC., San Francisco, CA (US)

(72) Inventors: Andrew John Harris, Golders Green (GB); Daniele Grandi, South Lake Tahoe, CA (US); Kendra Ann Wannamaker, Calgary (CA); Michael Chen, Toronto (CA); Allin Irving Groom, Edinburgh (GB)

(73) Assignee: AUTODESK, INC., San Francisco, CA (US)

( * ) Notice: Subject to any disclaimer, the term of this patent is extended or adjusted under 35 U.S.C. 154(b) by 0 days.

(21) Appl. No.: 18/759,517

(22) Filed: Jun. 28, 2024

(51) Int. Cl.
*G06F 16/242* (2019.01)
*G06F 16/248* (2019.01)
*G06F 30/20* (2020.01)
*G06F 119/18* (2020.01)

(52) U.S. Cl.
CPC ........ *G06F 16/2425* (2019.01); *G06F 16/248* (2019.01); *G06F 30/20* (2020.01); *G06F 2119/18* (2020.01)

(58) Field of Classification Search
CPC .... G06F 16/2425; G06F 16/248; G06F 30/20; G06F 2119/18
See application file for complete search history.

(56) References Cited

U.S. PATENT DOCUMENTS

| | | | |
|---|---|---|---|
| 12,245,882 B2 * | 3/2025 | Min | A61B 6/5217 |
| 2005/0187918 A1 * | 8/2005 | Fitzgerald | G16C 20/90 |
| 2018/0067475 A1 * | 3/2018 | Jacobs, II | G05B 19/4093 |
| 2021/0280277 A1 * | 9/2021 | Matsuda | G06F 3/017 |
| 2024/0386015 A1 * | 11/2024 | Crabtree | G06F 16/9024 |
| 2024/0420808 A1 * | 12/2024 | Shirasawa | G16C 20/30 |
| 2025/0068142 A1 * | 2/2025 | Melkote | G05B 19/4097 |
| 2025/0086434 A1 * | 3/2025 | Wiesmann Rothuizen | G06N 3/0455 |

* cited by examiner

*Primary Examiner* — Jorge A Casanova

(74) *Attorney, Agent, or Firm* — Artegis Law Group, LLP

(57) ABSTRACT

Various embodiments are directed towards techniques for determining materials for computer-generated designs that include generating a query prompt based on an assembly context, transmitting the query prompt to a plurality of large language model (LLM) agents for processing, receiving a plurality of material attribute filters from the plurality of LLM agents, where each LLM generates a different material attribute filter when processing the query prompt, combining the material attribute filters included in the plurality of material attribute filters to produce a material query, querying a material database using the material query to identify at least one potential material to use for a design, evaluating simulation results to determine whether the at least one material is an appropriate material to use for the design.

21 Claims, 4 Drawing Sheets

FILTERING MATERIALS BASED ON USER INTENT CAPTURE USING LARGE LANGUAGE MODELS

BACKGROUND

Field of the Various Embodiments

The various embodiments relate generally to computer-aided design, material science, and artificial intelligence and, more specifically, to filtering materials based on user intent capture using large language models.

Description of the Related Art

Engineers and designers oftentimes use computer-aided design (CAD) software to create digital designs of products and systems. Among other things, CAD software enables engineers and designers to visualize and simulate their designs, enabling quick and efficient iteration. CAD software allows for the creation of complex three-dimension (3D) models, accurate dimensioning, and the simulation of real-world conditions, such as stress analysis and motion and dynamic simulation. CAD software also facilitates collaboration among team members and stakeholders, as digital designs can be easily shared and reviewed. As a general matter, CAD software plays an important role in the engineering and design process by streamlining design workflows and enabling the development of high-quality, innovative designs.

One aspect of the engineering and design workflow is the selection of one or more appropriate materials to use for the product being designed. The material from which a product is made can have a substantial impact on several aspects the product including, without limitation, the functionality of the product, the strength of the product, the weight of the product, and the durability of the product. Additionally, the materials used for a product can impact the aesthetic aspects of the product, such as the smell and feel of the product. For these reasons, engineers and designers usually consider many different material options for their designs. In selecting the appropriate materials, an engineer or designer may assess the expected usage requirements of a design, consult with a materials experts about the characteristics and limitations of various materials, and/or run simulations of the design using different materials.

One drawback of the above process for selecting materials for a design is the level of technical expertise and know-how needed to select the appropriate materials for a given design. Many engineers and designers do not have the necessary technical knowledge to evaluate complex material selection problems without consulting a materials expert. In this regard, an engineer or designer typically has to consider the different physical and aesthetic properties of numerous materials in the context of how a given design is expected to be used. For example, an engineer designing a bicycle may need to consider materials that are sturdy enough to provide stability, light enough to lift easily, and weather resistant if left outside. If an engineer or designer does not have the requisite materials expertise or fails to consider certain material or use cases for a design, unintended mistakes or non-optimized designs can result, which sometimes are discoverable, if at all, only after one or more design prototypes have been manufactured. These problems are exacerbated when a design includes multiple different materials because the interactions among the materials have to be considered, which adds another level of complexity to the materials selection process and increases the need for materials expertise.

Additionally, material selection plays an important role when determining the manufacturing process that should be used to manufacture a given design. Different manufacturers typically specialize in different specific subsets of materials and manufacturing processes, and different manufacturing processes have different costs. Without the requisite materials expertise, an engineer or designer may not be able to assess different manufacturing processes effectively and, as a result, make costly planning mistakes by selecting an incorrect or suboptimal material for a design.

Another drawback of conventional approaches for determining what materials should be used for a design is that the process typically involves selecting one or more materials for the design, incorporating those material into the design, and then performing simulations to test the efficacy of the selected materials. Material libraries in convention CAD applications can include hundreds or thousands of different materials. Having to iterate through these steps for numerous different materials consumes a lot of time and can impinge on the design timeline. Consequently, an engineer or designer usually can test only a subset of the materials that are available to use for a given design. As a result, only a portion of the overall design space is normally explored, leading to sub-optimal material choices and reduced design quality.

As the foregoing illustrates, what is needed in the art are more effective techniques for determining the materials to use with CAD object designs.

SUMMARY

One embodiment of computer-implemented method for determining materials for computer-generated designs includes generating a query prompt based on an assembly context, transmitting the query prompt to a plurality of large language model (LLM) agents for processing, receiving a plurality of material attribute filters from the plurality of LLM agents, where each LLM generates a different material attribute filter when processing the query prompt, combining the material attribute filters included in the plurality of material attribute filters to produce a material query, querying a material database using the material query to identify at least one potential material to use for a design, and evaluating simulation results to determine whether the at least one material is an appropriate material to use for the design. Further, the simulation results are generated from at least one simulation of the design using the at least one material.

One technical advantage of the disclosed techniques relative to the prior art is that the disclosed techniques enable suitable materials for designs to be automatically identified and evaluated without requiring users and designers to have the have the level of knowledge about material science, mechanics, mechanical engineering, or mechanical design that is typically required with conventional approaches. Accordingly, computer-aided design applications that incorporate the disclosed techniques can be accessed by a far broader range of users and designers to generate designs made of suitable materials than what conventional computer-aided design applications allow. Further, because the disclosed techniques can substantially reduce the amount of time required to identify suitable materials for designs, the disclosed techniques enable users and designers to more fully explore the overall design space, which can result in more optimized materials being selected for and incorporated into designs, thereby increasing overall design quality. These technical advantages provide one or more technological advances over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
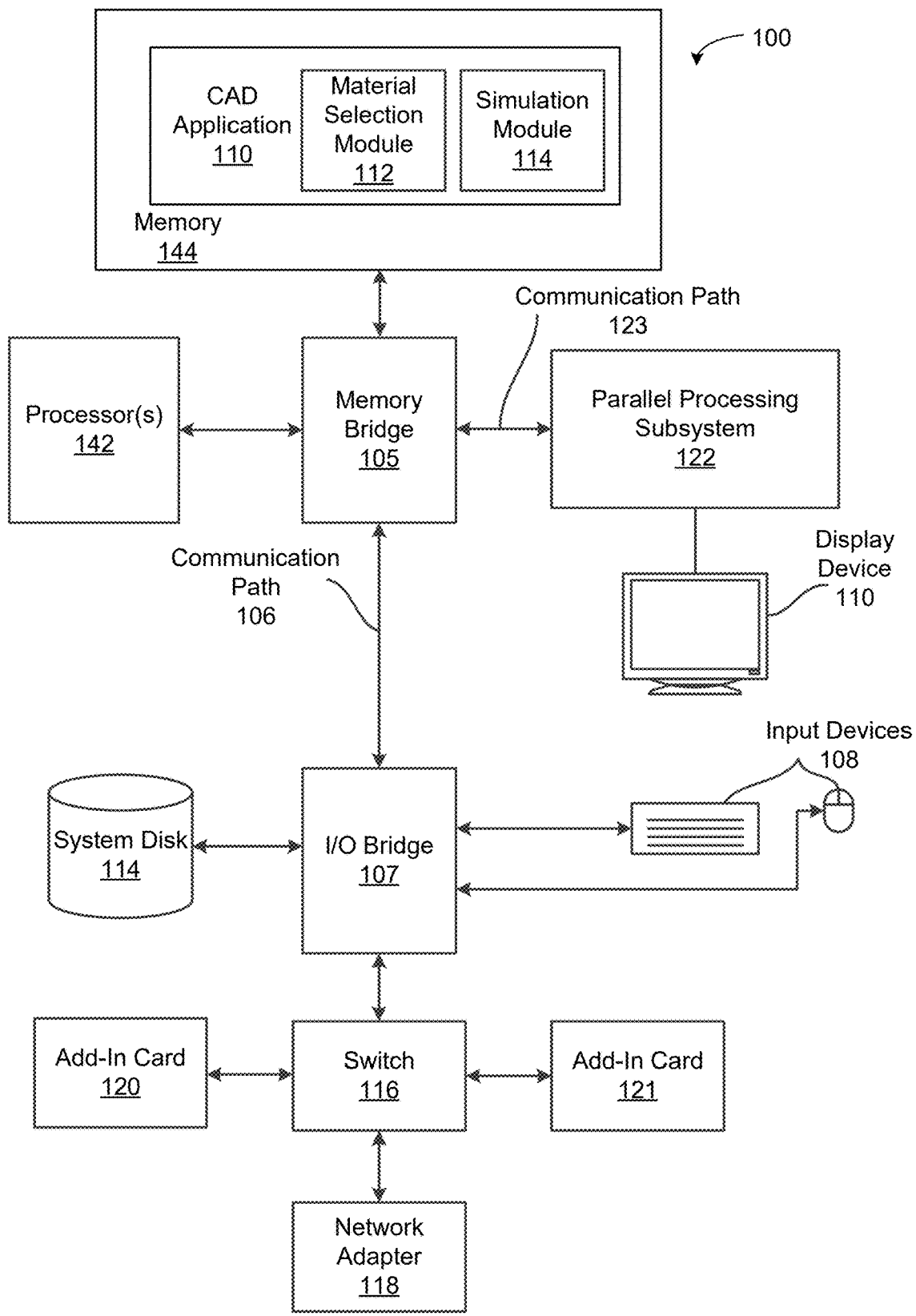
FIG. 1 is a conceptual block diagram of a computing device that is configured to implement one or more aspects of the various embodiments.

FIG. 1 is a conceptual block diagram of a computing device 100 that is configured to implement one or more aspects of the various embodiments. Computer device 100 may include any type of computing system, including, without limitation, a server machine, a server platform, a desktop machine, a laptop machine, a hand-held/mobile device, a digital kiosk, an in-vehicle infotainment system, and/or a wearable device. In some embodiments, computing device 100 is a server machine operating in a data center or a cloud computing environment that provides scalable computing resources as a service over a network.

In various embodiments, computing device 100 includes, without limitation, the processor(s) 142 and the memory(ies) 144 coupled to a parallel processing subsystem 122 via a memory bridge 105 and a communication path 123. Memory bridge 105 is further coupled to an I/O (input/output) bridge 107 via a communication path 106, and I/O bridge 217 is, in turn, coupled to a switch 116.

In one embodiment, I/O bridge 107 is configured to receive user input information from optional input devices 108, such as a keyboard, mouse, touch screen, sensor data analysis (e.g., evaluating gestures, speech, or other information about one or more uses in a field of view or sensory field of one or more sensors), and/or the like, and forward the input information to the processor(s) 142 for processing. In some embodiments, computing device 100 may be a server machine in a cloud computing environment. In such embodiments, computing device 100 may not include input devices 108 but may receive equivalent input information by receiving commands (e.g., responsive to one or more inputs from a remote computing device) in the form of messages transmitted over a network and received via the network adapter 118. In some embodiments, switch 116 is configured to provide connections between I/O bridge 107 and other components of the computing device 100, such as a network adapter 118 and various add-in cards 120 and 121.

In some embodiments, I/O bridge 107 is coupled to a system disk 114 that may be configured to store content and applications and data for use by processor(s) 142 and parallel processing subsystem 122. In one embodiment, system disk 114 provides non-volatile storage for applications and data and may include fixed or removable hard disk drives, flash memory devices, and CD-ROM (compact disc read-only-memory), DVD-ROM (digital versatile disc-rom), Blu-ray, HD-DVD (high-definition DVD), or other magnetic, optical, or solid state storage devices. In various embodiments, other components, such as universal serial bus or other port connections, compact disc drives, digital versatile disc drives, film recording devices, and the like, may be connected to I/O bridge 107 as well.

In various embodiments, memory bridge 105 may be a northbridge chip, and I/O bridge 107 may be a southbridge chip. In addition, communication paths 106 and 123, as well as other communication paths within computing device 100, may be implemented using any technically suitable protocols, including, without limitation, AGP (accelerated graphics port), hyper-transport, or any other bus or point-to-point communication protocol known in the art.

In some embodiments, parallel processing subsystem 122 comprises a graphics subsystem that delivers pixels to an optional display device 110 that may be any conventional cathode ray tube, liquid crystal display, light-emitting diode display, and/or the like. In such embodiments, the parallel processing subsystem 122 may incorporate circuitry optimized for graphics and video processing, including, for example, video output circuitry. Such circuitry may be incorporated across one or more parallel processing units (PPUs), also referred to herein as parallel processors, included within the parallel processing subsystem 122.

In some embodiments, the parallel processing subsystem 122 incorporates circuitry optimized (e.g., That undergoes optimization) for general purpose and/or compute processing. Again, such circuitry may be incorporated across one or more PPUs included within parallel processing subsystem 122 that are configured to perform such general purpose and/or compute operations. In yet other embodiments, the one or more PPUs included within parallel processing subsystem 122 may be configured to perform graphics processing, general purpose processing, and/or compute processing operations. System memory 144 includes at least one device driver configured to manage the processing operations of the one or more PPUs within parallel processing subsystem 122. In addition, the system memory 144 includes the CAD application 110. Although described herein primarily with respect to the CAD application 110, techniques disclosed herein can also be implemented, either entirely or in part, in other software and/or hardware, such as in the parallel processing subsystem 122.

In various embodiments, parallel processing subsystem 122 may be integrated with one or more of the other elements of FIG. 1 to form a single system. For example, parallel processing subsystem 122 may be integrated with processor 142 and other connection circuitry on a single chip to form a system on a chip (soc).

In some embodiments, processor(s) 142 includes the primary processor of computing device 100, controlling and coordinating operations of other system components. In some embodiments, the processor(s) 142 issues commands that control the operation of PPUs. In some embodiments, communication path 123 is a PCI express link, in which dedicated lanes are allocated to each PPU. Other communication paths may also be used. The PPU advantageously implements a highly parallel processing architecture, and the PPU may be provided with any amount of local parallel processing memory (pp memory).

It will be appreciated that the system shown herein is illustrative and that variations and modifications are possible. The connection topology, including the number and arrangement of bridges or the number of parallel processing subsystems 212, may be modified as desired. For example, in some embodiments, system memory 144 could be connected to the processor(s) 142 directly rather than through memory bridge 105, and other devices may communicate with system memory 144 via memory bridge 105 and processor 142. In other embodiments, parallel processing subsystem 122 may be connected to I/O bridge 107 or directly to processor 142, rather than to memory bridge 105. In still other embodiments, I/O bridge 107 and memory bridge 105 may be integrated into a single chip instead of existing as one or more discrete devices. In certain embodiments, one or more components shown in FIG. 1 may not be present. For example, switch 116 could be eliminated, and network adapter 118 and add-in cards 120, 121 would connect directly to I/O bridge 107. Lastly, in certain embodiments, one or more components shown in FIG. 1 may be implemented as virtualized resources in a virtual computing environment, such as a cloud computing environment. In particular, the parallel processing subsystem 122 may be implemented as a virtualized parallel processing subsystem in at least one embodiment. For example, the parallel processing subsystem 122 may be implemented as a virtual graphics processing unit(s) (VPU(s)) that renders graphics on a virtual machine(s) (VM(s)) executing on a server machine(s) whose GPU(s) and other physical resources are shared across one or more VMs.

In some embodiments, the CAD application 110 is configured to produce designs, select appropriate materials, and perform physical simulations of user designs with potential materials. CAD application 110 includes material selection module 112 and simulation module 114. Material selection module 112 is used in the selection of appropriate materials. Techniques that material selection module 112 can use to select appropriate materials are discussed in greater detail below in conjunction with FIGS. 2 and 3. Simulation module 114 is used in the simulation of user designs with potential materials.

Filtering Materials Based on User Intent Capture

Figure 2:
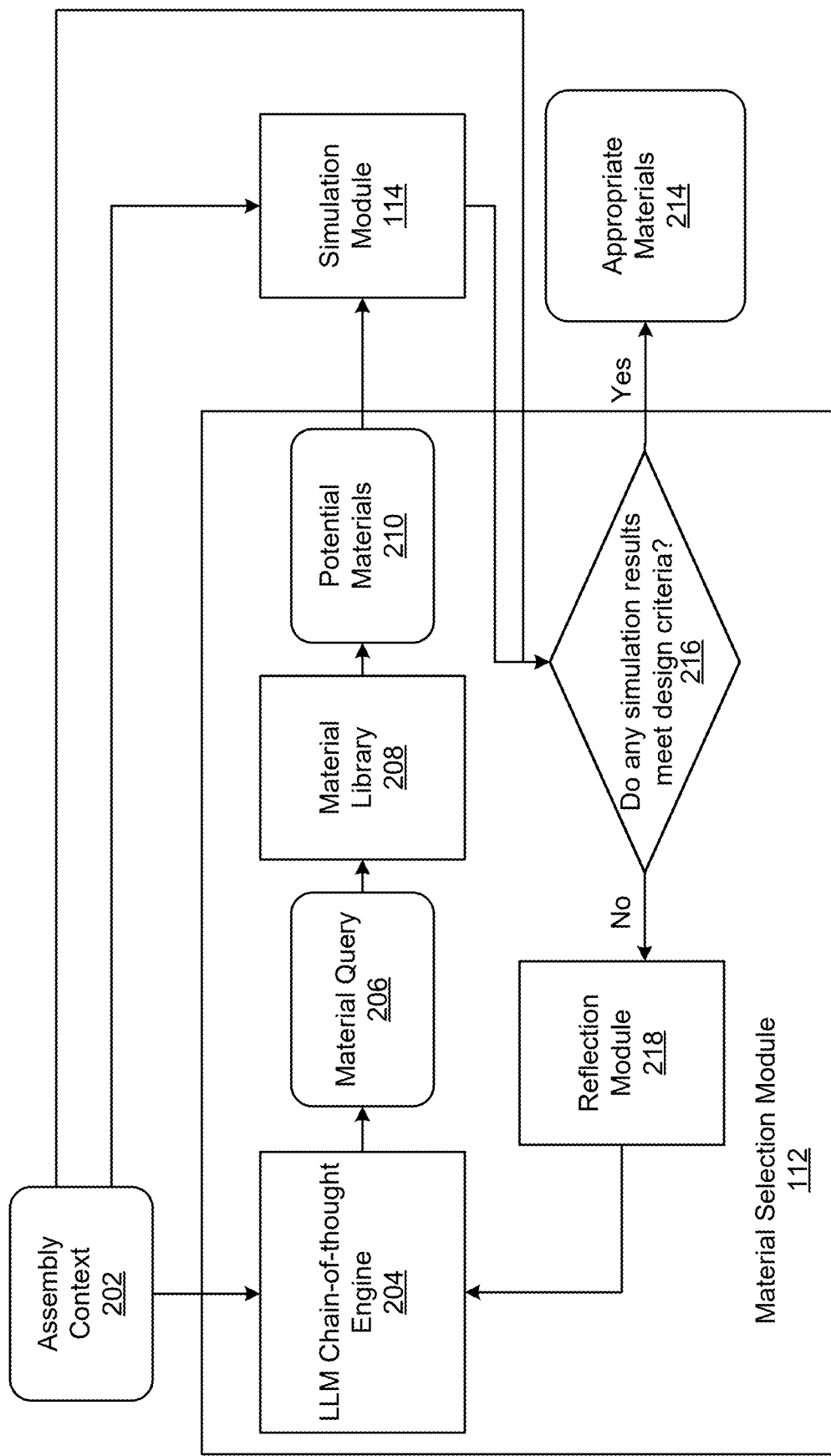
FIG. 2 is a more detailed illustration of the material selection module of FIG. 1, according to various embodiments.

FIG. 2 is a more detailed illustration of material selection module 112 of FIG. 1, according to various embodiments. As shown, material selection module 112 includes LLM chain-of-thought engine 204, material library 208, and reflection module 218. Material selection module 112 also interfaces with simulation module 114 to receive results from simulations that are performed on a given design using potential materials 210, as described in greater detail below. In operation, material selection module 112 accepts assembly context 202 as input and performs a series of operations to generate appropriate materials 214.

Assembly context 202 includes structured information and context about a design being developed in CAD application 110. In various embodiments, assembly context 202 includes information directly from the CAD environment (e.g., the design name, design volume, surface area) as well as a user-provided description of the intent or purpose of the design. For example, the user may specify that the design being developed is a bicycle that is robust enough to handle various riding conditions and can handle exposure to various kinds of weather. Assembly context 202 also includes user-specified design criteria that specify the acceptable operating ranges of the design. For example, if the user is designing a lightweight bicycle for racing, the design criteria may specify a maximum weight for the bicycle.

LLM chain-of-thought engine 204 accepts assembly context 202 as input and generates a material query 206. As described in greater detail below in conjunction with FIG. 3, to generate material query 206, LLM chain-of-thought engine 204 initializes a set of LLM agents, where each LLM agent is initialized with context associated with both a description and the properties of a given material attribute (e., density, elastic limit, Young's modulus). The material attribute context provides the LLM agent with information about the distribution of values for the material attribute and how different attribute values manifest in different physical and aesthetic properties when implemented in a design. LLM chain-of-thought engine 204 processes assembly context 202 into a query prompt passed to each given LLM agent related to how, if at all, assembly context 202 places restrictions on the material attribute corresponding to the given LLM agent. LLM chain-of-thought engine 204 then prompts each given LLM agent to identify an appropriate filter for the attribute corresponding to the given LLM agent. The different identified filters are subsequently combined to produce material query 206.

Material library 208 includes a structured list of materials available for the design being developed and various material properties. In various embodiments, material library 208 may be a module of CAD application 110 or an external third-party software application. Material library 208 applies material query 206 to the structured list of materials and, based on the different filters included in material query 206, filters the available materials in material library 208 to produce potential materials 210. Potential materials 210 is the set of available materials that satisfy all the filtering criteria specified in material query 206.

Potential materials 210 are passed to simulation module 114 along with assembly context 202. In various embodiments, simulation module 114 is a submodule of CAD application 110 that is capable simulating various physical and chemical phenomena for a given design, where the design is made of a specified material. Simulation module 114 performs simulations of the design being developed based on potential materials 210, where, for a given simulation, a different potential material 210 is used for the design being developed. Simulation module 114 generates simulation results for each simulation performed. For example, simulation module 114 may compute for the design being developed with a potential material 210 an estimated weight of the resulting design, or the design's robustness to various forces and strains. After simulations have been completed for all potential materials 210, the simulation results are passed to logic 216 for assessment.

At logic 216, the simulation results are compared to the design criteria included in assembly context 202 to determine which, if any, of potential materials 210 meet the design criteria. Any potential material 210 that meets the design criteria is returned as an appropriate material 214. If none of potential materials 210 meets the design criteria, then the simulation results are passed to reflection module 218. In some embodiments, rather than passing the simulation results to reflection module 218, logic 216 may, instead, output a message informing the user that no appropriate materials could be identified. In such cases, the user can update the information included in assembly context 202, and the updated assembly context 202 can be inputted into LLM chain-of-though engine 204, as described above.

Reflection module 218 processes the simulation results and constructs a query prompt to prompt the LLM agents to create new filters to respond to the simulation results. Each LLM agent uses the chain-of-thought procedure to retain memory of prompts and context from previous iterations. The query prompt constructed by reflection module 218 takes advantage of the chain-of-thought procedure to leverage prior information. Therefore, each LLM agent can be updated with the current simulation results to produce updated filters. The query prompt constructed by reflection module 218 is passed to LLM chain-of-thought engine 204, and the process implemented by material selection module 112 and simulation module 114 repeats until a set of appropriate materials 214 is identified.

Figure 3:
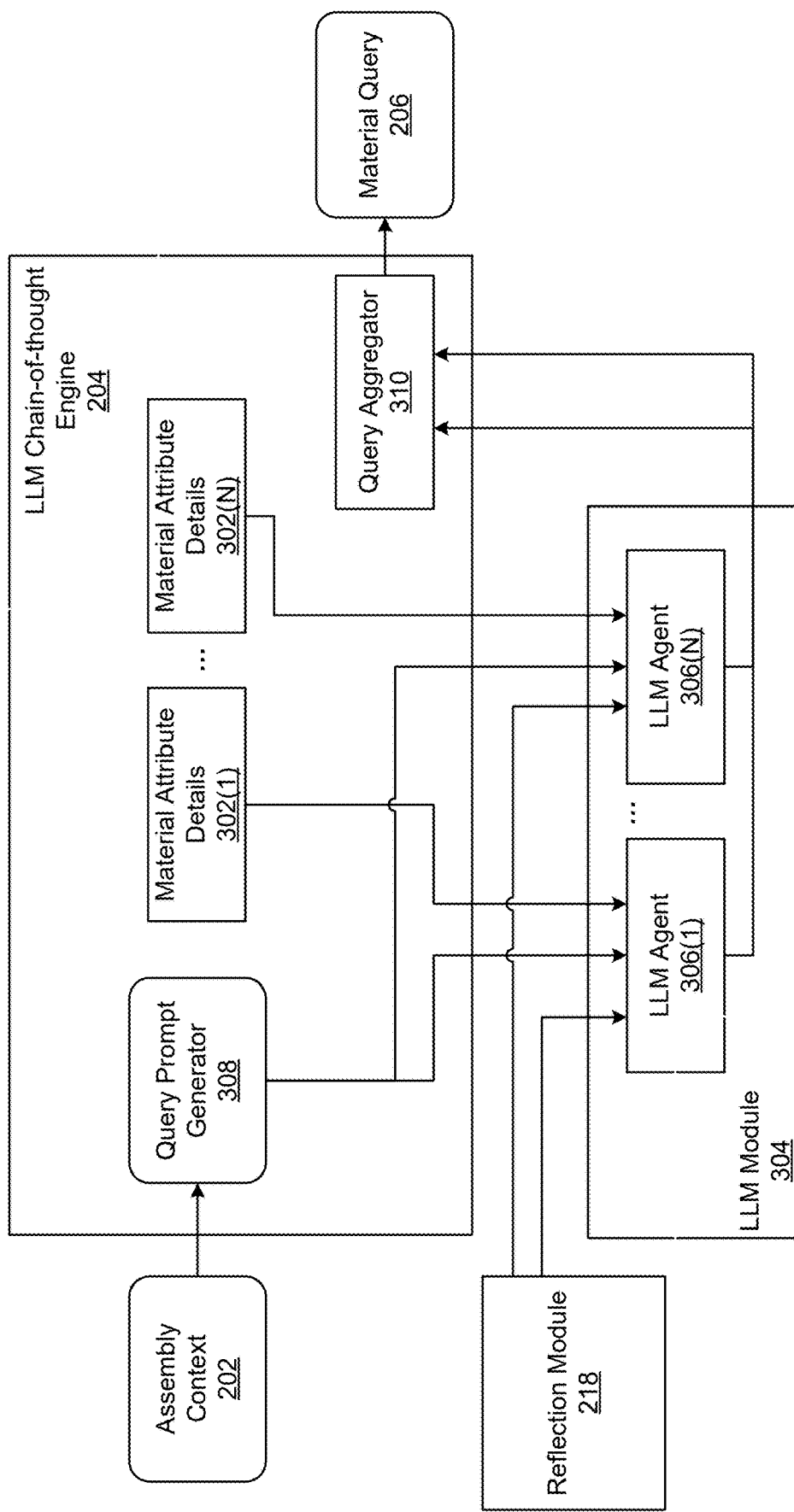
FIG. 3 is a more detailed illustration of the LLM chain-of-thought engine of FIG. 2, according to various embodiments.

FIG. 3 is a more detailed illustration of LLM chain-of-thought engine 204 of FIG. 2, according to various embodiments. As shown, LLM chain-of-thought engine 204 includes query prompt generator 308, query aggregator 310, and material attribute details 302(1) . . . (N). As also shown, LLM chain-of-thought engine 204 additionally interfaces with LLM module 304, which includes LLM agents 306(1) . . . (N). Reflection module 218 also interfaces with LLM module 304. In operation, LLM chain-of-thought engine 204 accepts assembly context 202 as input and produces material query 206 as an output during a first iteration. If no appropriate materials 214 are produced in the first iteration through LLM chain-of-thought engine 204, then reflection module 218 passes the simulation results generated by simulation module 114 (as described above in conjunction with FIG. 2) to LLM module 304, which in combination with query aggregator 310 generates an updated material query 206 as an output. The updated material query 206 is processed within material selection module 112 similarly to how the initial material query 206 is processed within material selection module 112 (as also described above in conjunction with FIG. 2). Notably, any time an iteration through LLM chain-of-thought module 204 does not result in one or more appropriate materials being identified, reflection module 218 passes the simulation results generated by simulation module 114 to LLM module 304 so that an updated material query 206 can be generated and processed.

Turning now to the more specific operations of LLM chain-of-thought engine 204 and LLM module 304, assembly context 202 is first passed to query prompt generator 308, which processes the structured design information of assembly context 202 into a natural language query prompt appropriate for an LLM. The query prompt describes the design being developed and the user-specified intent or purpose for the design and prompts the LLM agent 306 to suggest the range of material attribute values for a given material attribute that likely would meet the design criteria specified by the user. The query prompt further requests LLM agent 306 to return the range of material attribute values as a material attribute filter in a structured format. For example, the query prompt may ask the LLM agent 306 whether assembly context 202 includes any information about a specific material attribute. If so, the query prompt further requests the agent to extract the relevant information from assembly context 202 as a range on the values relevant material attribute, and to return the range as a material attribute filter in a structured format (e.g., JSON, SQL).

Material attribute details 302 are a collection of material attributes, detailed natural language descriptions of what the material attributes represent, and the physical, chemical, and aesthetic properties that manifest for different material attribute values. In some embodiments, each material attribute details 302 provides context about a particular material attribute to a different corresponding LLM agent 306 as well as reference information about the range and distribution of values for that particular material attribute. In some embodiments, material attributes 302 may not reside within LLM chain-of-thought engine 204 and, instead, be included in or associated with material library 208 or some other external source of material information.

LLM Module 304 hosts and manages one or more LLM agents 306. As shown, LLM module 304 executes outside of CAD application 110, either as a separate application in the computing device 100 or as an application executing on another computing device that interacts with computing device 100. In other embodiments LLM module 304 can be incorporated into LLM chain-of-though engine 204 or otherwise included in CAD application 110.

In operation, material attribute details 302 are used to initialize corresponding LLM agents 306 within LLM module 304. In addition to the material attribute context provided by material attribute details 302, additional initialization context or procedures may be used to initialize LLM agents 306. For example, LLM agents 306 may be initialized with context prompts instructing LLM agents 306 to assist a user in selecting an appropriate material for design being developed by the user. LLM agents 306 also may be initialized or implemented in ways that makes LLM agents 306 better suited to proposing filters for various material attributes. For example, LLM agents 306 may receive additional fine-tuning training on technical documents relevant to materials science and engineering. In other embodiments, LLM agents 306 may be implemented with a retrieval-augmented generation (RAG) procedure, which enables LLM agents 306 to reference specific reference documents when composing a response.

After LLM agents 306 have been initialized with material attribute details 302, LLM agents 306 receive the query prompt generated by query prompt generator 308. Each LLM agent 306 processes the query prompt in the context of a corresponding material attribute and, in response, produces a range of material attribute values as a filter in a structured format. Each material attribute filter generated by LLM agents 306 is passed to query aggregator 310, which combines the different material attribute filters to produce material query 206.

As described above, in some iterations, material selection module 112 may not generate any potential materials 210 that meet the user-specified design criteria. In such cases, the simulation results from simulation module 114 are passed to reflection module 218. Upon receiving those simulation results, reflection module 218 processes the simulation results and constructs a query prompt that prompts the LLM agents 306 to create new material attribute filters based on the simulation results. Each LLM agent 306 uses the chain-of-thought procedure to retain memory of different query prompts and context received during previous iterations. After receiving the query prompt with information about simulation results from reflection module 218, each of LLM agents 306 produces material attribute filters in a similar manner to the first iteration, as described above, but with the addition of information from the simulation results. These material attribute filters are passed to query aggregator 310 to produce an updated material query 206. Consistent with operations described above in conjunction with FIG. 2, the updated material query 206 produces a new set of potential materials 210 from material library 208, and potential materials 210 are evaluated by simulation module 114 and compared to the user-specified design criteria. This process repeats, passing simulation results to reflection module 218 to generate and process updated material queries 206 until one or more potential materials 210 that meet the user-specified design criteria are found.

As noted above, in some embodiments, rather than passing the simulation results to reflection module 218, logic 216 may, instead, output a message informing the user that no appropriate materials could be identified. In such cases, the user can update the information included in assembly context 202, and the updated assembly context 202 can be inputted into LLM chain-of-though engine 204, as previously described.

Figure 4:
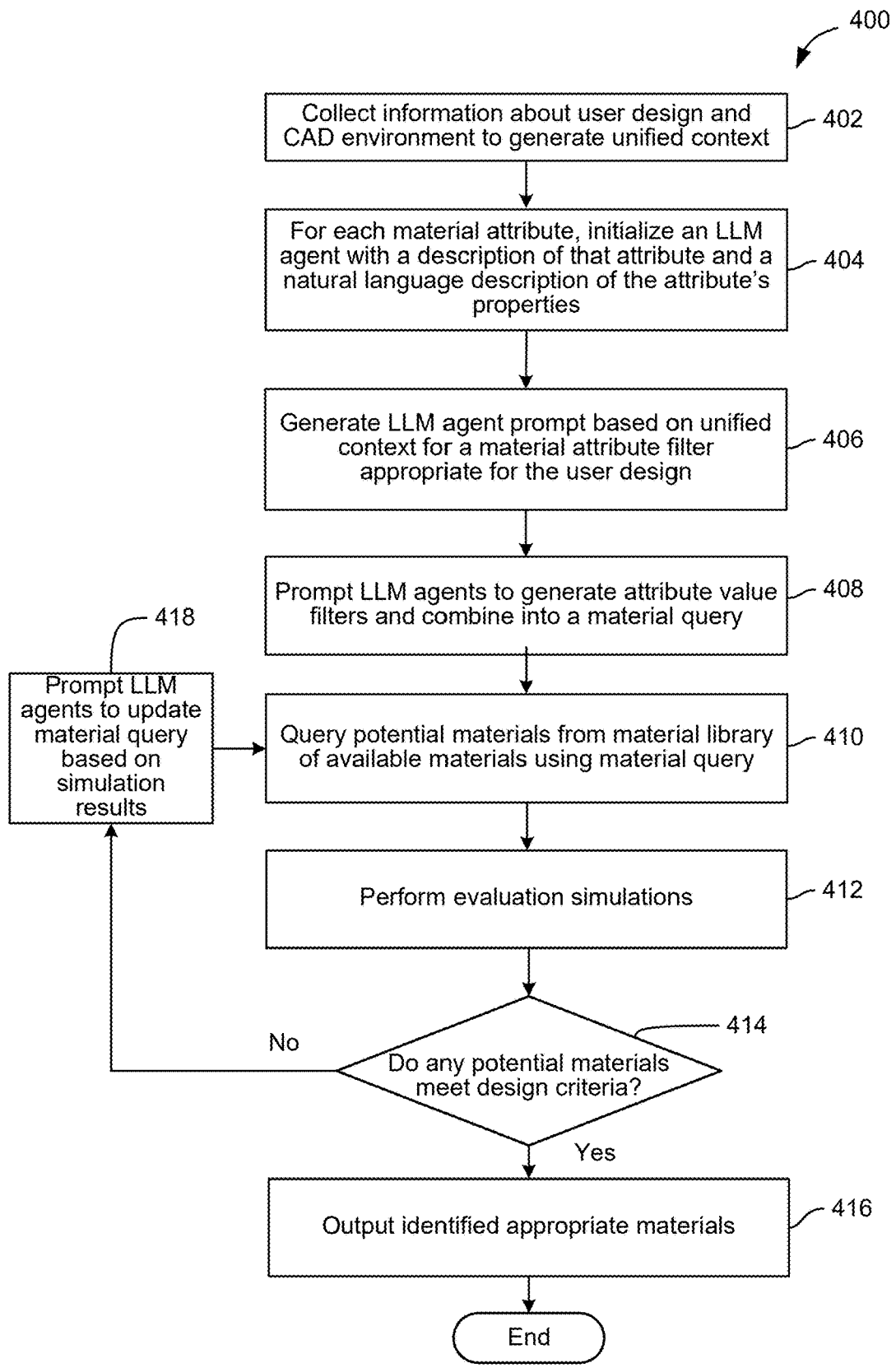
FIG. 4 sets forth a flow diagram of method steps for determining appropriate materials for a design, according to various embodiments.

FIG. 4 sets forth a flow diagram of method steps for determining appropriate materials for a design, according to various embodiments. Although the method steps are described in conjunction with the systems of FIGS. 1-3, persons skilled in the art will understand that any system configured to perform the method steps in any order falls within the scope of the present disclosure.

As shown, method 400 begins at step 402, where information is collected from the user and the CAD application 110 to produce assembly context 202. Assembly context 202 includes structured information and context about a design being developed in CAD application 110. In various embodiments, assembly context 202 includes information directly from the CAD environment (e.g., the design name, design volume, surface area) as well as a user-provided description of the intent or purpose of the design. Assembly context 202 also includes user-specified design criteria that specify the acceptable operating ranges of the design.

At step 404, LLM agents 306 are initialized with material attribute details 302. Material attribute details 302 are a collection of material attributes, detailed natural language descriptions of what the material attributes represent, and the physical, chemical, and aesthetic properties that manifest for different material attribute values. Each material attribute details 302 corresponds to a different LLM agent 306.

At step 406, assembly context 202 is passed to query prompt generator 308, which produces a natural language LLM query prompt for the material attribute values that likely would meet the design criteria specified by the user.

At step 408, each LLM agent 306 processes the query prompt produced by query prompt generator 308 in the context of the material attribute corresponding to the particular LLM agent 306. In response, each LLM agent 306 produces a range of material attribute values as a material attribute filter in a structured format. Each material attribute filter generated by LLM agents 306 is passed to query aggregator 308, which combines the different material attribute filters to produce material query 206.

At step 410, material query 206 is used to query material library 208. Material library 208 includes a structured list of materials available for the design being developed and various material properties. Application of material query 206 produces a list of potential materials 210 corresponding to the filters in material query 206.

At step 412, the potential materials 210 produced from querying material library 208 along with assembly context 202 are passed to simulation module 114. Simulation module 114 performs simulations of the design being developed based on potential materials 210. For a given simulation, a different potential material 210 is used for the design being developed.

At step 414, the results from simulation module 114 are compared against the user-specified design criteria included in assembly context 202. At step 416, any potential material 210 that meets the user specified design criteria is returned as an appropriate material 214, and method 400 then terminates. If none of potential materials 210 meets the design criteria, then the simulation results are passed to reflection module 218, and the method 400 proceeds to step 418.

Again, in some embodiments (not shown in FIG. 4), rather than passing the simulation results to reflection module 218, logic 216 may, instead, output a message informing the user that no appropriate materials could be identified. In such cases, the user can update the information included in assembly context 202, and the updated assembly context 202 can be inputted into LLM chain-of-though engine 204, as previously described.

At step 418, reflection module 218 processes the simulation results produced by simulation module 114 into updated an updated query prompt for LLM agents 306. LLM agents 306 produce updated material attribute filters responding to the simulation results while maintaining context from previous iterations using a chain-of-thought procedure. The updated filters are aggregated by query aggregator 310 to produce an updated material query 206. Method 400 then returns to step 410, and iteration continues until at least one appropriate material 214 is produced.

In sum, techniques are disclosed for filtering materials based on user intent capture with large language models (LLMs). In various embodiments, information is collected from both the user and the CAD environment about a given design. The information may include the design name, the physical dimensions and properties of the design, and user-provided descriptions of the intended uses of the design. These inputs make up the unified context of the design. A group of LLM agents is then initialized, where a different LLM agent is initialized for each material attribute being evaluated. A given LLM agent is initialized with the unified context of the design, along with descriptive details of the corresponding material attribute and specific material attribute values for each candidate material that is available to use for the design. In operation, each LLM agent parses the unified context of the design in the context of the material attribute corresponding to the LLM agent and generates appropriate filters for the materials that are available for the design. The filters are subsequently applied to the available candidate materials to generate a set of potential materials to use for the design. Each potential material is evaluated via simulation according to design criteria specified by the user, and the potential materials are ranked based on the simulation results. If one or more potential materials meet the specified design criteria, then those materials are designated as appropriate materials. If none of the potential materials meets the design criteria, then the results of the simulations are passed back to the LLM agents. The LLM agents are then prompted by the system to adjust the material parameters to meet the criteria. This process repeats until the design criteria are met and at least one material is designated as an appropriate material.

One technical advantage of the disclosed techniques relative to the prior art is that the disclosed techniques enable suitable materials for designs to be automatically identified and evaluated without requiring users and designers to have the have the level of knowledge about material science, mechanics, mechanical engineering, or mechanical design that is typically required with conventional approaches. Accordingly, computer-aided design applications that incorporate the disclosed techniques can be accessed by a far broader range of users and designers to generate designs made of suitable materials than what conventional computer-aided design applications allow. Further, because the disclosed techniques can substantially reduce the amount of time required to identify suitable materials for designs, the disclosed techniques enable users and designers to more fully explore the overall design space, which can result in more optimized materials being selected for and incorporated into designs, thereby increasing overall design quality. These technical advantages provide one or more technological advances over prior art approaches Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for determining materials for computer-generated designs, the method comprising:
    generating a query prompt based on an assembly context;
    transmitting the query prompt to a plurality of large language model (LLM) agents for processing;
    receiving a plurality of material attribute filters from the plurality of LLM agents, wherein each LLM generates a different material attribute filter when processing the query prompt;
    combining the material attribute filters included in the plurality of material attribute filters to produce a material query;
    querying a material database using the material query to identify at least one potential material to use for a design; and
    evaluating simulation results to determine whether the at least one material is an appropriate material to use for the design, wherein the simulation results are generated from at least one simulation of the design using the at least one material.

2. The computer-implemented method of claim 1, wherein the assembly context includes structured information and context related to the design.

3. The computer-implemented method of claim 1, wherein each LLM agent included in the plurality of LLM agents corresponds to a different material attribute, wherein each LLM agent processes the query prompt in a context of the different material attribute corresponding to the LLM agent.

4. The computer-implemented method of claim 1, wherein the query prompt comprises a natural language query prompt for a plurality of material attribute values that likely would meet a plurality of design criteria specified for the design.

5. The computer-implemented method of claim 1, wherein the simulation results are evaluated based on at least one design criteria included in the assembly context.

6. The computer-implemented method of claim 5, wherein the at least one material satisfies the at least one design criteria, and further comprising designating the at least one material as an appropriate material to use for the design.

7. The computer-implemented method of claim 5, wherein the at least one material does not satisfy the at least one design criteria, and further comprising transmitting the simulation results to a reflection module for further processing.

8. The computer-implemented method of claim 7, wherein the reflection module processes the simulation results and generates an updated query prompt based on the simulation results.

9. The computer-implemented method of claim 8, wherein the reflection module transmits the updated query prompt to the plurality of LLM agents for processing.

10. The computer-implemented method of claim 9, further comprising receiving a plurality of updated material attribute filters from the plurality of LLM agents, wherein each LLM generates a different updated material attribute filter when processing the query prompt, and combining the different updated material attribute filters included in the plurality of material attribute filters to produce an updated material query.

11. One or more non-transitory computer-readable media including instructions that, when executed by one or more processors, cause the one or more processor to perform the steps of:
generating a query prompt based on an assembly context;
transmitting the query prompt to a plurality of large language model (LLM) agents for processing;
receiving a plurality of material attribute filters from the plurality of LLM agents, wherein each LLM generates a different material attribute filter when processing the query prompt;
combining the material attribute filters included in the plurality of material attribute filters to produce a material query;
querying a material database using the material query to identify at least one potential material to use for a design; and
evaluating simulation results to determine whether the at least one material is an appropriate material to use for the design, wherein the simulation results are generated from at least one simulation of the design using the at least one material.

12. The one or more non-transitory computer-readable media of claim 11, wherein the assembly context includes at least one of information about the design taken directly from a computer-aided design environment, a user-provided description of an intent or a purpose of the design, or user-defined design criteria specifying acceptable operating ranges of the design.

13. The one or more non-transitory computer-readable media of claim 11, wherein each LLM agent is initialized with different material attribute details that include at least one of a natural language description of what one or more material attributes represent or at least one of a physical, a chemical, or an aesthetic property that manifests for a given material attribute value.

14. The one or more non-transitory computer-readable media of claim 11, wherein each LLM agent included in the plurality of LLM agents corresponds to a different material attribute, wherein each LLM agent processes the query prompt in a context of the different material attribute corresponding to the LLM agent.

15. The one or more non-transitory computer-readable media of claim 11, wherein evaluating the simulation results comprises comparing the simulation results to one or more design criteria to determine whether the at least one material satisfies the one or more design criteria.

16. The one or more non-transitory computer-readable media of claim 15, wherein the at least one material satisfies the one or more design criteria, and further comprising designating the at least one material as an appropriate material to use for the design.

17. The one or more non-transitory computer-readable media of claim 15, wherein the at least one material does not satisfy the one or more design criteria, and further comprising transmitting the simulation results to a reflection module for further processing.

18. The one or more non-transitory computer-readable media of claim 17, wherein the reflection module processes the simulation results and generates an updated query prompt based on the simulation results.

19. The one or more non-transitory computer-readable media of claim 18, wherein the reflection module transmits the updated query prompt to the plurality of LLM agents for processing.

20. The one or more non-transitory computer-readable media of claim 19, further comprising receiving a plurality of updated material attribute filters from the plurality of LLM agents, wherein each LLM generates a different updated material attribute filter when processing the query prompt, and combining the different updated material attribute filters included in the plurality of material attribute filters to produce an updated material query.

21. A system, comprising:
one or more memories storing instructions; and
one or more processors that are coupled to the one or more memories and, when executing the instructions, are configured to perform the steps of:
generating a query prompt based on an assembly context;
transmitting the query prompt to a plurality of large language model (LLM) agents for processing;
receiving a plurality of material attribute filters from the plurality of LLM agents, wherein each LLM generates a different material attribute filter when processing the query prompt;
combining the material attribute filters included in the plurality of material attribute filters to produce a material query;
querying a material database using the material query to identify at least one potential material to use for a design; and
evaluating simulation results to determine whether the at least one material is an appropriate material to use for the design, wherein the simulation results are generated from at least one simulation of the design using the at least one material.

* * * * *